United States Patent

Woehrle et al.

(10) Patent No.: US 8,563,177 B2
(45) Date of Patent: Oct. 22, 2013

(54) GALVANIC ELEMENT

(75) Inventors: Thomas Woehrle, Stuttgart-Feuerbach (DE); Joachim Fetzer, Bad-Ditzenbach (DE)

(73) Assignees: SB LiMotive Germany GmbH, Stuttgart (DE); SB LiMotive Company Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/516,194

(22) PCT Filed: Oct. 28, 2010

(86) PCT No.: PCT/EP2010/066360
§ 371 (c)(1),
(2), (4) Date: Jun. 14, 2012

(87) PCT Pub. No.: WO2011/072940
PCT Pub. Date: Jun. 23, 2011

(65) Prior Publication Data
US 2012/0251881 A1 Oct. 4, 2012

(30) Foreign Application Priority Data
Dec. 18, 2009 (DE) .......................... 10 2009 054 939

(51) Int. Cl.
*H01M 8/00* (2006.01)

(52) U.S. Cl.
USPC ....................................... 429/231.8; 429/217

(58) Field of Classification Search
USPC .......... 429/231.95, 217, 231.8, 215; 427/122; 977/948
See application file for complete search history.

(56) References Cited

U.S. PATENT DOCUMENTS

| | | | |
|---|---|---|---|
| 6,136,470 A * | 10/2000 | Dix et al. ....................... | 429/212 |
| 7,071,258 B1 | 7/2006 | Jang et al. | |
| 2008/0178837 A1 | 7/2008 | Saitou et al. | |
| 2009/0117467 A1 | 5/2009 | Zhamu et al. | |
| 2009/0291353 A1 * | 11/2009 | Affinito et al. ................. | 429/50 |
| 2009/0325071 A1 * | 12/2009 | Verbrugge et al. ............ | 429/219 |
| 2010/0291438 A1 * | 11/2010 | Ahn et al. ...................... | 429/212 |
| 2012/0064409 A1 * | 3/2012 | Zhamu et al. ................. | 429/221 |

FOREIGN PATENT DOCUMENTS

WO 2009142924 A2 11/2009

OTHER PUBLICATIONS

International Search Report corresponding to PCT Application No. PCT/EP2010/066360, mailed Feb. 7, 2011 (German and English language document) (5 pages).

* cited by examiner

*Primary Examiner* — Mark F Huff
*Assistant Examiner* — Monique Wills
(74) *Attorney, Agent, or Firm* — Maginot, Moore & Beck

(57) ABSTRACT

A galvanic element, for example a battery or an accumulator, in particular a lithium-ion cell, includes a negative electrode, a positive electrode, and a separator lying between the negative electrode and the positive electrode. In order to increase the specific capacitance, the negative electrode includes at least one layer system, said layer system including at least two graphene layers and at least one polymer layer. A polymer layer lies between two graphene layers.

14 Claims, 5 Drawing Sheets

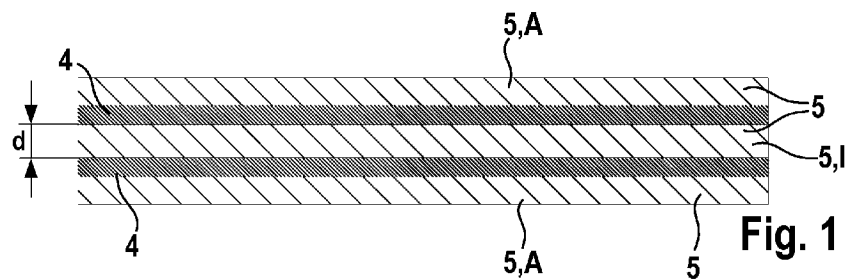
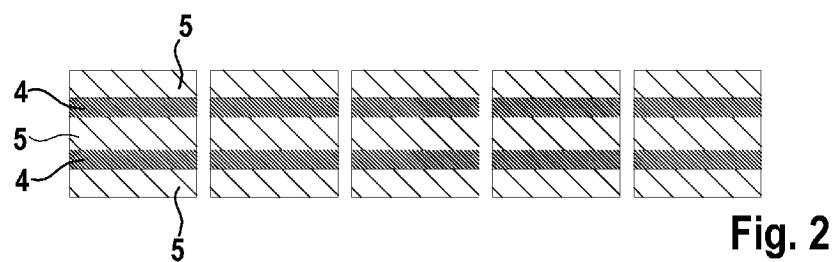
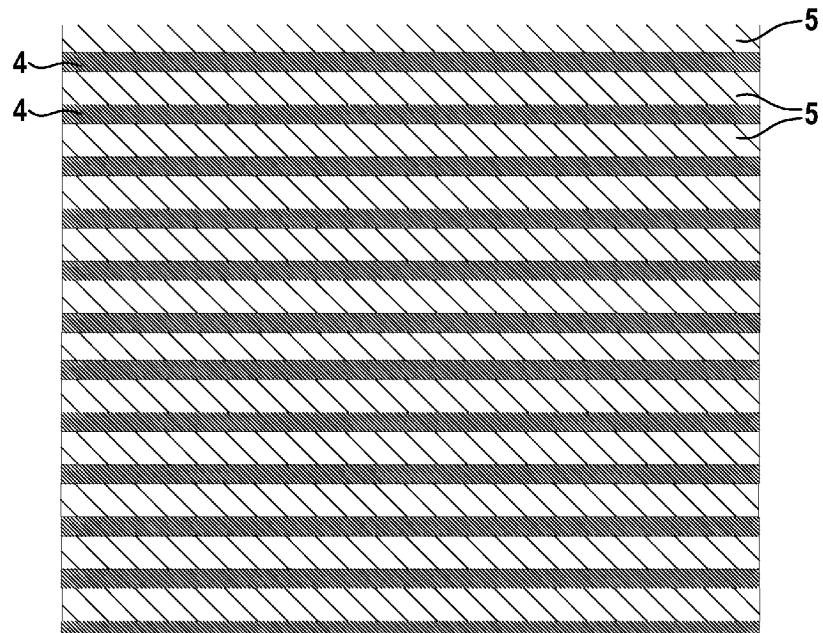

GALVANIC ELEMENT

This application is a 35 U.S.C. §371 National Stage Application of PCT/EP2010/066360, filed on Oct. 28, 2010, which claims the benefit of priority to Serial No. DE 10 2009 054 939.0, filed on Dec. 18, 2009 in Germany, the disclosures of which are incorporated herein by reference in their entirety.

The present disclosure relates to an electrochemical element and a process for producing it.

BACKGROUND

In lithium ion cells, the negative electrode, which is also referred to as anode, usually comprises graphite, known as intercalation graphite which is able to electrochemically incorporate and release lithium ions ($Li^+$) reversibly into and from its three-dimensional layer structure. This is also referred to as lithium intercalation and lithium deintercalation. However, the lithium uptake capacity of graphite is limited. When the graphite is fully lithiated, the carbon atoms of the graphite are present in a ratio to the lithium atoms of six to one. The stoichiometry is accordingly $Li_1C_6$. The specific reversible theoretical capacity of intercalation graphite is 372 mAh/g.

Apart from the limitation of the specific reversible theoretical capacity of 372 mAh/g, graphite has further disadvantages:

Since the electrical conductivity of graphite alone is not sufficient for high-power applications, the negative electrode usually additionally comprises conductive carbon black. However, conductive carbon black is very difficult to disperse in the coating composition during electrode production and also reduces the energy density of the system since conductive carbon black is a passive cell component. In addition, conventional electrodes containing conductive carbon black as electrically conductive material are more difficult to compact.

In addition, the crystallographic density of graphite can increase and decrease due to the incorporation and release of lithium atoms. As a result, an electrical connection between the conductive carbon black and a metallic contact element for contacting the negative electrode can be interrupted. This leads to a loss of cyclable capacity or to an increase in the internal resistance and the impedance of the lithium ion cell.

A further disadvantage of graphite is the formation of solid electrolyte interfaces (SEI). These solid electrolyte interfaces are formed on the graphite surface but require lithium ions which are ultimately withdrawn irreversibly. This leads to irreversible "consumption" of lithium in the first charging cycle.

The document US 2009/0117467 A1 describes a material composition which comprises a mixture of an electrochemically active material and nano sized graphene platelets for a negative electrode of a lithium ion cell. The nano sized graphene platelets are composed essentially of a plate of a graphene plane or of multiplates of stacked graphene planes joined to one another by means of van der Waals forces. The document US 2009/0117467 A1 discloses that both the electrochemically active material and the nano sized graphene platelets can absorb and desorb lithium ions.

SUMMARY

The present disclosure provides an electrochemical element, for example a battery or an accumulator, in particular a lithium ion cell, which comprises a negative electrode (which can also be referred to as anode), a positive electrode (which can also be referred to as cathode) and a separator which is arranged between the negative electrode and the positive electrode.

According to the disclosure, the negative electrode comprises at least one layer system which comprises at least two graphene layers and at least one polymer layer, with a polymer layer being arranged between two graphene layers.

A graphene layer can here be a single graphene sheet or a multi sheet system composed of from two to ten, for example from two to five, in particular two or three, stacked graphene sheets. A graphene layer preferably comprises a single graphene sheet. A graphene sheet can be, in particular, a layer of carbon atoms arranged in a hexagonal honeycomb structure having a layer thickness of one carbon atom (about 0.34 nm). For the purposes of the present disclosure, a graphene sheet is not considered to be a polymer.

When the electrochemical element is charged, lithium atoms can be adsorbed on the graphene layers and desorbed again from the graphene layers on discharging. These reactions advantageously have fast kinetics. In addition, the affinity between lithium atoms and the graphene layers is advantageously very high. Owing to the fast kinetics, the electrochemical element can advantageously be subjected to high currents. In addition, formation of solid electrolyte interfaces (SEI) composed of deposited metallic lithium can be avoided due to the fast kinetics. This can in turn prevent lithium being irreversibly withdrawn from the system during activation. This has the advantage that activation losses, which in the case of intercalation graphite are about 10%, can be avoided.

In addition, the graphene layers are separated from one another by the polymer layer in such a way that lithium atoms can be attached to both sides of the two graphene layers. In particular, two lithium atoms can in this way be bound per six-membered carbon ring of a graphene layer, which can result in a stoichiometry of $C_6Li_2$. Compared to graphite, which has a stoichiometry of $C_6Li$, twice as many lithium atoms can be attached per carbon atom in this way, which is advantageous. The negative electrode can therefore have a high lithium ion storage capacity, a high specific capacity of, in particular, 744 mAh/g, and an increased energy density, for example an energy density increased by from 10% to 35%. In addition, as a result of the increase in the specific capacity, the thickness of the negative electrode can advantageously be reduced and the ability to be subjected to high currents and to pulses can be improved.

Since the graphene layers themselves have a high electrical conductivity, conductive carbon black can also be dispensed with and decoupling of the conductive carbon black from a metallic contact electrode can be avoided. In this way, the life of the electrochemical element can be increased. In addition, the specific capacity, the internal resistance and the impedance of the electrochemical element can as a result be very stable over the life of the electrochemical element. Furthermore, the energy density can be increased slightly by avoidance of the passive component conductive carbon black.

In an embodiment of the electrochemical element, each graphene layer consists of a single graphene sheet.

In a further embodiment of the electrochemical element, lithium atoms are attached or can be attached to the graphene layers. In particular, lithium atoms can be attached to both sides of the graphene layers.

In a further embodiment of the electrochemical element, the ratio of the number of carbon atoms of the graphene layer to the number of lithium atoms attached to the graphene layer is from 6:1.8 to 6:2.2, in particular about 6:2.

In a further embodiment of the electrochemical element, the layer system comprises at least two graphene layers and at least two polymer layers, in particular a plurality of graphene layers and polymer layers, with the graphene layers and polymer layers being arranged alternately. As a result, at least one of the outer layers of the layer system is a polymer layer. This has the advantage that lithium atoms can become attached to both sides of the underlying graphene layer and, in the case of another graphene layer adjoining the polymer layer, lithium atoms can also become attached to both sides of the other graphene layer. It is thus possible, as a result of the polymer layer, for twice as many lithium atoms to be attached to the mutually facing sides of the graphene layers than in the case of graphite.

In a further embodiment of the electrochemical element, at least one outer layer of the layer system is therefore a polymer layer. In particular, both outer layers of the layer system can be polymer layers. As a result, lithium atoms can become attached to both sides of the underlying graphene layers and these graphene layers are separated from any other graphene layers adjoining the layer system by the outer polymer layers and thus cannot form graphite with these other layers. Thus, advantageously, twice as many lithium atoms can be attached to the mutually facing sides of the graphene layers as in the case of graphite.

The polymer layers preferably each have a layer thickness (d) which is, in particular, essentially constant over the length and width of the layer. The layer thickness (d) of the polymer layers is preferably at least sufficiently large for lithium atoms to be able to become attached to both graphene layers adjoining the polymer layer. For example, the polymer layers can each have a layer thickness (d) of ≥about 600 pm or about 700 pm or from about 800 pm to ≤30 μm, for example ≥1 nm and ≤200, for example ≥1 nm and ≤5 nm. Here, the polymer layer preferably have a very low layer thickness (d) which is nevertheless sufficient for lithium atoms to become attached to both graphene layers. The outer polymer layers of the layer system can optionally have a lower layer thickness (d) than the internal polymer layers of the layer system.

To establish electrical contact with the negative electrode and the positive electrode or to conduct electric current to and from the negative and positive electrode, the electrochemical element can further comprise two contact elements which can also be referred to as (current) collectors to which the negative electrode or the positive electrode, respectively, is applied. In particular, the electrochemical element can comprise a contact element for establishing electrical contact with the negative electrode and a contact element for establishing electrical contact to the positive electrode. The contact elements for electrically contacting the negative and positive electrodes can, for example, be metallic. In particular, the contact elements for electrically contacting the negative and positive electrodes can be identical or different metallic foils. For example, the contact element for electrically contacting the negative electrode can be made of copper and the contact element for electrically contacting the positive electrode can be made of aluminum or copper.

The layers of the layer system can be oriented perpendicular to, parallel to or randomly relative to the separator.

In a further embodiment of the electrochemical element, the layers of the layer system are oriented perpendicular to the separator. In this way, the lithium atoms can be transported quickly through the channel-like polymer layers. In addition, the layers of the layer system can be oriented perpendicular to a contact element for electrically contacting the negative electrode. In this way, the graphene layers can directly contact, in an electrically conductive fashion, the contact element for electrically contacting the negative electrode.

In a further embodiment of the electrochemical element, the negative electrode comprises a plurality of layer systems.

Furthermore, the negative electrode can comprise individual graphene layers, preferably consisting of a single graphene sheet, and/or layer systems composed of a graphene layer, preferably consisting of a single graphene sheet, and a polymer layer and/or graphite particles. The negative electrode preferably comprises individual graphene layers, preferably consisting of a single graphene sheet, and/or layer systems composed of a graphene layer, preferably consisting of a single graphene sheet, and a polymer layer. For example, the ratio of the sum of the number of layer systems composed of at least two graphene layers and at least one polymer layer to the sum of the number of individual graphene layers and/or layer systems composed of a graphene layer and a polymer layer can be 1:1. Polymer outer layers of the layer system composed of at least two graphene layers and at least one polymer layer can prevent graphene layers becoming attached to these and forming graphite and can make it possible for lithium atoms to be able to become attached to both sides of the graphene layers.

In a further embodiment of the electrochemical element, the negative electrode comprises a binder. A plurality of layer systems can be embedded, in particular homogeneously distributed, in this binder. The polymer layers and the binder can be made of the same material. The binder, which can also be referred to as electrode binder, can mechanically join the layer systems and any other electrochemically active additives embedded therein, with one another and with the contact element for electrical contacting of the negative electrode. In addition, the binder can electrically connect the graphene layers of the layer systems and any other electrochemically active additives embedded therein to the contact element for electrically contacting the negative electrode.

In a further embodiment of the electrochemical element, the polymer layers and/or the binder comprise(s) at least one polymer selected from the group consisting of polyvinylidene fluoride (PVdF), polyvinylidene-hexafluoropropylene copolymer (PVdF-HFP), cellulose or polystyrene-butadiene copolymer and mixtures thereof. For example, the polymer of the polymer layer and/or the binder can be an electrode binder based on polyvinylidene fluoride, polyvinylidene-hexafluoropropylene copolymer, cellulose and/or polystyrene-butadiene copolymer.

Apart from the layer systems, individual graphene layers, preferably consisting of a single graphene sheet, and/or layer systems composed of a graphene layer, preferably consisting of a single graphene sheet, and a polymer layer and/or graphite particles and/or soft carbon particles and/or hard carbon particles can also be embedded, in particular homogeneously distributed, in this binder. Preference is given to individual graphene layers, preferably consisting of a single graphene sheet, and/or layer systems composed of a graphene layer, preferably consisting of a single graphene sheet, and a polymer layer being embedded in the binder.

The negative electrode can comprise graphene, graphite, soft carbons and hard carbons and also other electrochemically active additives such as titanium, silicon, germanium, tin, lead, antimony, bismuth, zinc, aluminum, cadmium, in metallic form, in the form of alloys and/or in the form of compounds and/or salts, for example in the form of oxides, hydroxides, carbides, nitrides, sulfides, phosphides, selenides, tellurides, antimonides, in particular silicon. For example, the negative electrode can comprise from ≥0% by weight to ≤10% by weight, for example from ≥5% by weight to ≤10% by weight, of silicon, for example from ≥0% by weight to ≤5% by weight of additives and from ≥90% by weight to ≤100% by weight, for example from ≥90% by weight to ≤95% by weight, for example from ≥95% by weight to ≤100% by weight, of graphene, where the sum of the percentages by weight of graphene and the additives add up to 100% by weight.

However, the negative electrode can comprise no titanium, silicon, germanium, tin, lead, antimony, bismuth, zinc, aluminum, cadmium, in metallic form, in the form of alloys and/or in the form of compounds and/or salts, for example in the form of oxides, hydroxides, carbides, nitrides, sulfides, phosphides, selenides, tellurides, antimonides, or no further electrochemically active additive other than graphene, graphite, soft carbons and hard carbons, in particular other than graphene.

The positive electrode can, for example, comprise lithium-cobalt oxide ($LiCoO_2$), lithium-manganese spinel ($LiMn_2O_4$), lithium-nickel-cobalt-manganese oxides (NCM) and mixtures thereof as electrochemically active material of the positive electrode.

In particular, the electrochemical element can comprise a lithium ion rolled cell or a lithium ion stacked cell.

The electrochemical element of the disclosure can, for example, have a capacity of from ≥10 mAh to ≤500 Ah, in particular from ≥4 Ah to ≤60 Ah.

The present disclosure further provides a process for producing a negative electrode of an electrochemical element according to the disclosure, in particular for producing an electrochemical element according to the disclosure, which comprises the process steps:
a) application of a first graphene layer to a substrate; and
b) application of a first polymer layer to the first graphene layer; and
c) application of a second graphene layer to the first polymer layer.

In an embodiment of the process, the first graphene layer is applied to the substrate by chemical vapor deposition in process step a). The substrate can be a metallic substrate, for example copper or nickel. In an embodiment, the substrate can subsequently be used as metallic contact electrode for contacting the graphene layers. The second graphene layer can, if desired, likewise be produced directly on the first polymer layer and applied thereto by chemical vapor deposition in process step c). However, the second graphene layer can also be produced beforehand by chemical vapor deposition on another, for example metallic, substrate and in process step c) be applied, in particular transferred, to the first polymer layer. The graphene layers can, for example, be produced by chemical vapor deposition of methane on a metallic substrate. Such a process is described, for example, by Kim et al. in the document "Large-Scale Pattern Growth of Graphene Films for Strechable Transparent Electrodes", Nature 457, 2009, p. 706.

The first polymer layer can be applied to the first graphene layer in process step b) by means of a coating process, for example, by spin coating. The first polymer layer can be joined to the second graphene layer by, for example, the first polymer layer being thermoplastic and being heated and cooled again during or after application of the second graphene layer, optionally under subatmospheric pressure.

However, the first polymer layer can also be applied in the form of a double-sided adhesive film to the first graphene layer in process step b). The second graphene layer can subsequently be applied, in particular fixed, to the free side of the double-sided adhesive film.

Furthermore, the process can comprise, after process step c), the process step: d) application of a second polymer layer to the first and/or second graphene layer. The application of the second polymer layer can likewise be effected by a coating process, for example by spin coating, or by application of a double-sided adhesive film.

Furthermore, the process can comprise, after process step d), one or more process steps:
e) application of a further graphene layer to the second polymer layer; and
application of a further polymer layer to the further graphene layer.

The further graphene layers and polymer layers can be produced or applied by the above-described methods.

To produce a layer system having a plurality of alternating graphene layers and polymer layers, the process can further comprise the process step:
f) production of at least two layer systems which each comprise at least one first graphene layer, a first polymer layer, a second graphene layer and optionally a second polymer layer, and
stacking the layer systems on top of one another, in particular in such a way that a graphene layer adjoins a polymer layer.

For example, if the substrate is later not to perform a function of the electrochemical element, the process can comprise the process step:
g) peeling of the layer system from the substrate.

Furthermore, the process can comprise the process step:
h) division of the layer system, for example by cutting or milling, into a plurality of layer systems.

The layer systems produced in this way can be applied to a metallic contact electrode and/or a separator. In particular, the one side of the layer system can be applied to the contact electrode and the other side of the layer system can be applied to the separator. The layers of the layer system can be oriented perpendicular to, parallel to or randomly relative to the contact electrode or the separator.

A random orientation can, for example, be based on a plurality of layer systems being mixed in a binder and a metallic foil, for example a foil made of aluminum or copper, being coated with the binder-layer system mixture. This arrangement later forms, in particular, the negative electrode of the electrochemical element. In addition to the layer systems, it is possible, as described above, for further materials, for example individual graphene layers and/or graphene layer-polymer layer systems and/or graphite to be mixed into the binder. The coated, metallic foil can optionally then be cut into smaller pieces.

A positive electrode can be produced in an analogous way by applying an electrochemically active material, for example lithium-cobalt oxide ($Li-CoO_2$), to a metallic foil, for example a foil made of copper or aluminum.

A separator layer can subsequently be applied to the binder-layer system layer of the negative electrode and the electrochemically active material layer of the positive electrode can in turn be applied thereto. The resulting layer system can subsequently be divided into smaller pieces and/or be rolled up. Next, the contacts (poles) can be welded onto the metallic foils. Finally, the arrangement can be transferred to a housing, electrolyte can be introduced, the housing can be closed, for example by laser welding, and the electrochemical element can be activated, for example by application of an electric current or an electric potential.

BRIEF DESCRIPTION OF THE DRAWINGS

Further advantages and advantageous embodiments of the subjects of the disclosure are illustrated by the drawings and explained in the following description.

Here, it should be noted that the drawings have only descriptive character and are not intended to restrict the disclosure in any way. In the drawings:

FIG. 1 shows a schematic cross section through a first embodiment of a layer system of a negative electrode according to the disclosure having two graphene layers and three polymer layers arranged alternately with the graphene layers;

FIG. 2 shows a schematic cross section through a plurality of layer systems produced by dividing the layer system of FIG. 1, according to a second embodiment;

FIG. 3 shows a schematic cross section through a third embodiment of a layer system of a negative electrode according to the disclosure having a plurality of alternating graphene layers and polymer layers;

DETAILED DESCRIPTION

Figure 4:
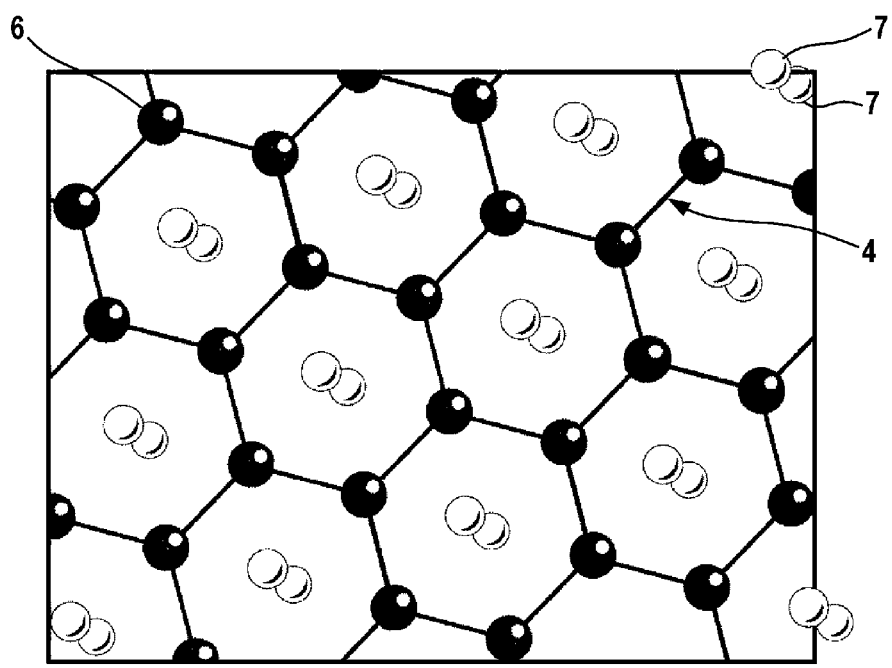
FIG. 4 shows a schematic perspective view of a graphene layer consisting of one graphene sheet with lithium atoms attached thereto which are present in a ratio to the carbon atoms of the graphene layer of 2:6.

FIG. 1 shows a first embodiment of a layer system 5,4,5,4,5 of a negative electrode according to the disclosure. In this embodiment, the layer system 5,4,5,4,5 comprises two graphene layers 4 and three polymer layers 5. The polymer layers 5 are arranged alternately with the graphene layers 4. A polymer layer 5 having a layer thickness d is arranged between the two graphene layers 4 and can thus be referred to as internal polymer layer I. Furthermore, the two outer layers A of the layer system 5,4,5,4,5 are also polymer layers 5. FIG. 1 shows that the outer polymer layers A of the layer system 5,4,5,4,5 have a lower layer thickness d than the internal polymer layers 1 of the layer system 5,4,5,4,5.

FIG. 2 shows that a plurality of layer systems 5,4,5,4,5 according to the second embodiment of layer systems 5,4,5, 4,5 according to the disclosure has been produced by division of the layer system 5,4,5,4,5 of FIG. 1.

FIG. 3 shows a third embodiment of a layer system 5,4,5, 4,5 of a negative electrode according to the disclosure. In this embodiment, the layer system 5,4,5,4,5 comprises a plurality of alternating graphene layers 4 and polymer layers 5. The two outer layers A of the layer systems 5,4,5,4,5 are polymer layers 5 in this embodiment too.

FIG. 4 shows a graphene layer consisting of one graphene sheet. FIG. 4 illustrates that lithium atoms are attached to the graphene sheet on both sides. FIG. 4 shows that the lithium atoms 7 are present in a ratio to the carbon atoms 6 of the graphene layer 4 of 2:6.

Figure 5:
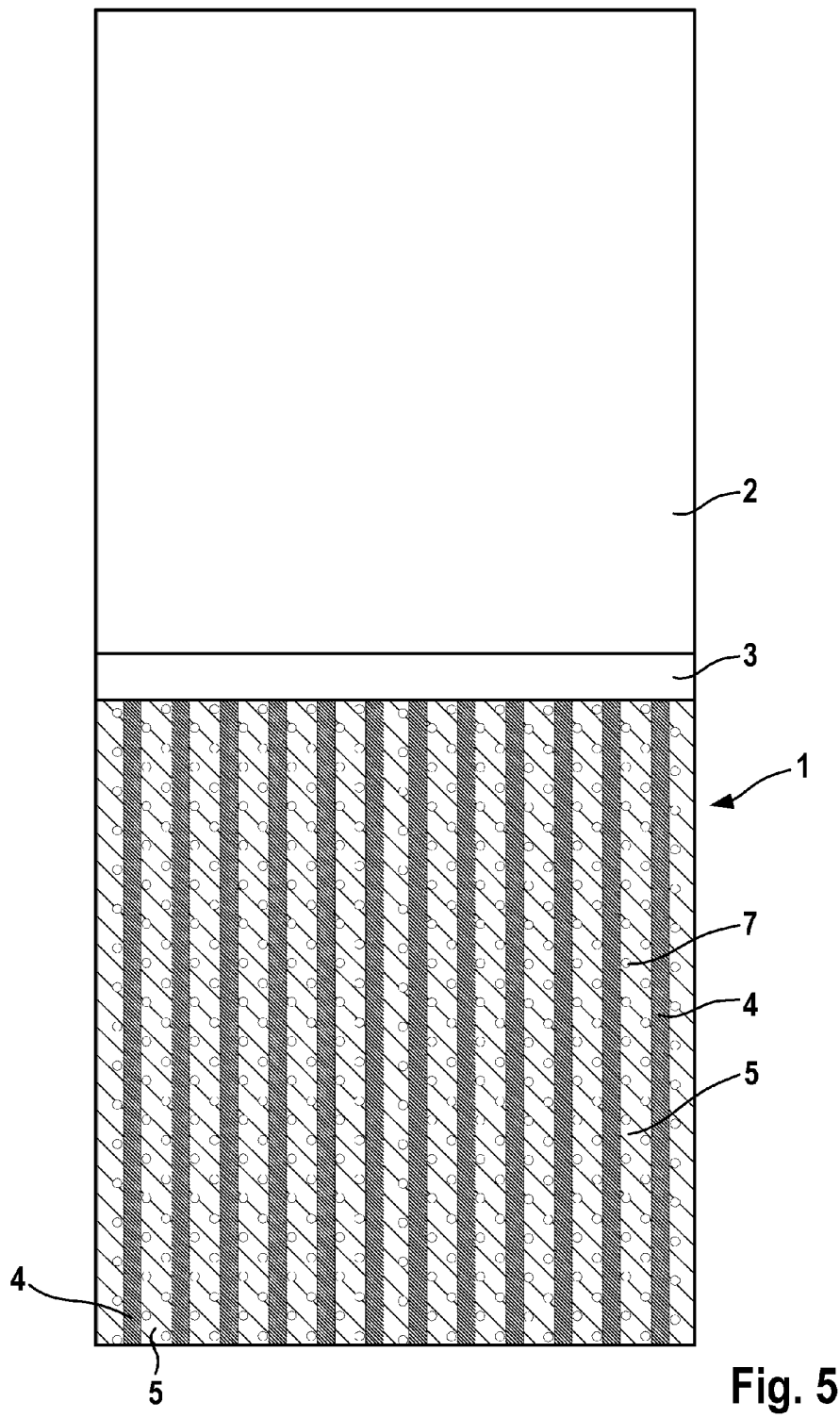
FIG. 5 shows a schematic cross section through a first embodiment of an electrochemical element according to the disclosure having a positive electrode, a separator and a negative electrode, with the layers of the layer system of the negative electrode being oriented perpendicular to the separator.

FIG. 5 shows a first embodiment of an electrochemical element according to the disclosure which comprises a negative electrode 1, a positive electrode 2 and a separator 3. FIG. 5 shows that the negative electrode comprises a layer system 5,4,5 composed of a plurality of alternating graphene layers 4 and polymer layers 5. FIG. 5 shows that lithium atoms 7 are attached to the graphene layers 4 on both sides. In this embodiment, the layers 4,5 of the layer system 5,4,5 are oriented perpendicular to the separator 3.

Figure 6:
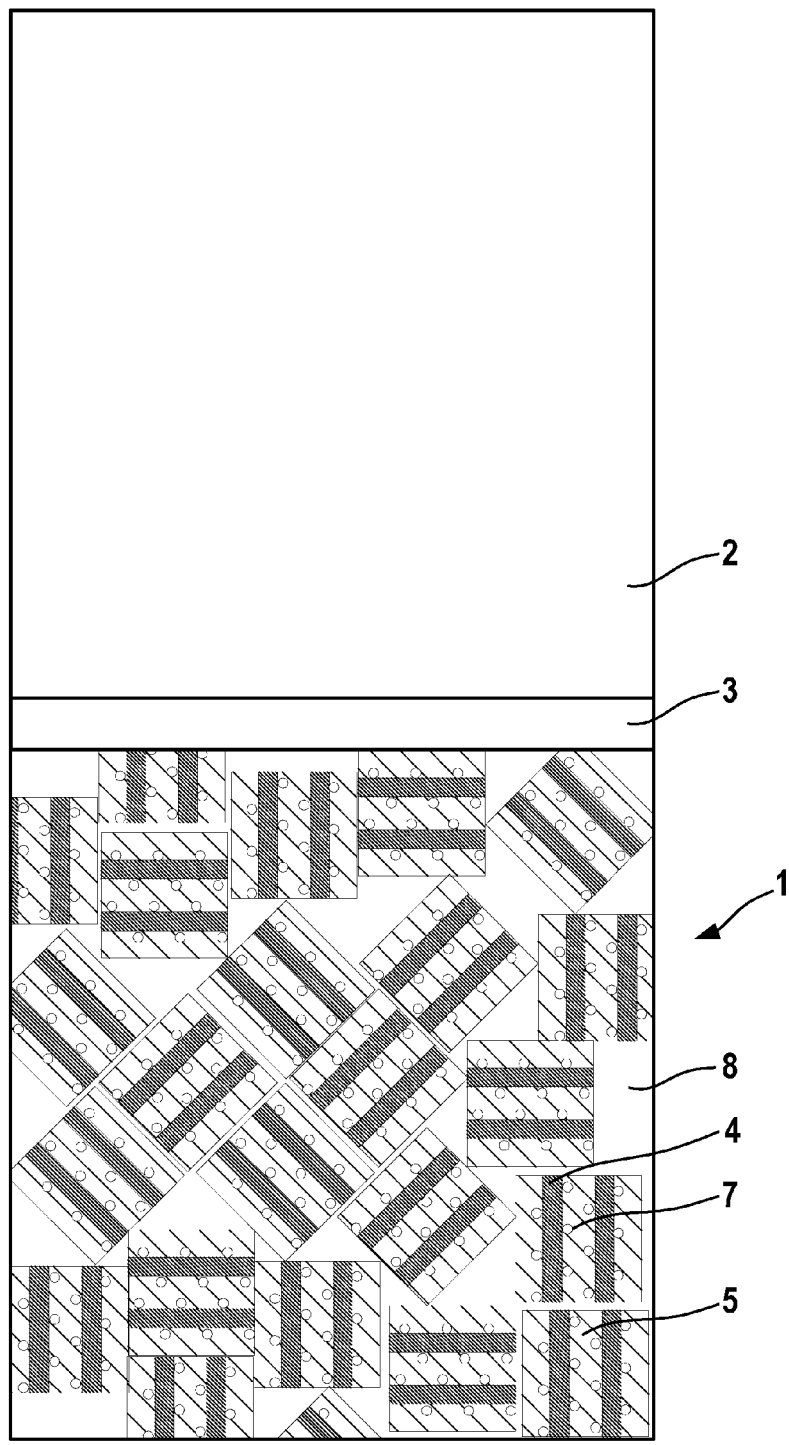
FIG. 6 shows a schematic cross section through a second embodiment of an electrochemical element according to the disclosure having a positive electrode, a separator and a negative electrode, with the layers of the layer system of the negative electrode being oriented randomly relative to the separator.

The second embodiment of an electrochemical element according to the disclosure shown in FIG. 6 differs from the first embodiment of an electrochemical element according to the disclosure shown in FIG. 5 in that the negative electrode 1 comprises a plurality of layer systems 4,5,4 which are oriented randomly relative to the separator 3 and are embedded in a binder 8.

Figure 7:
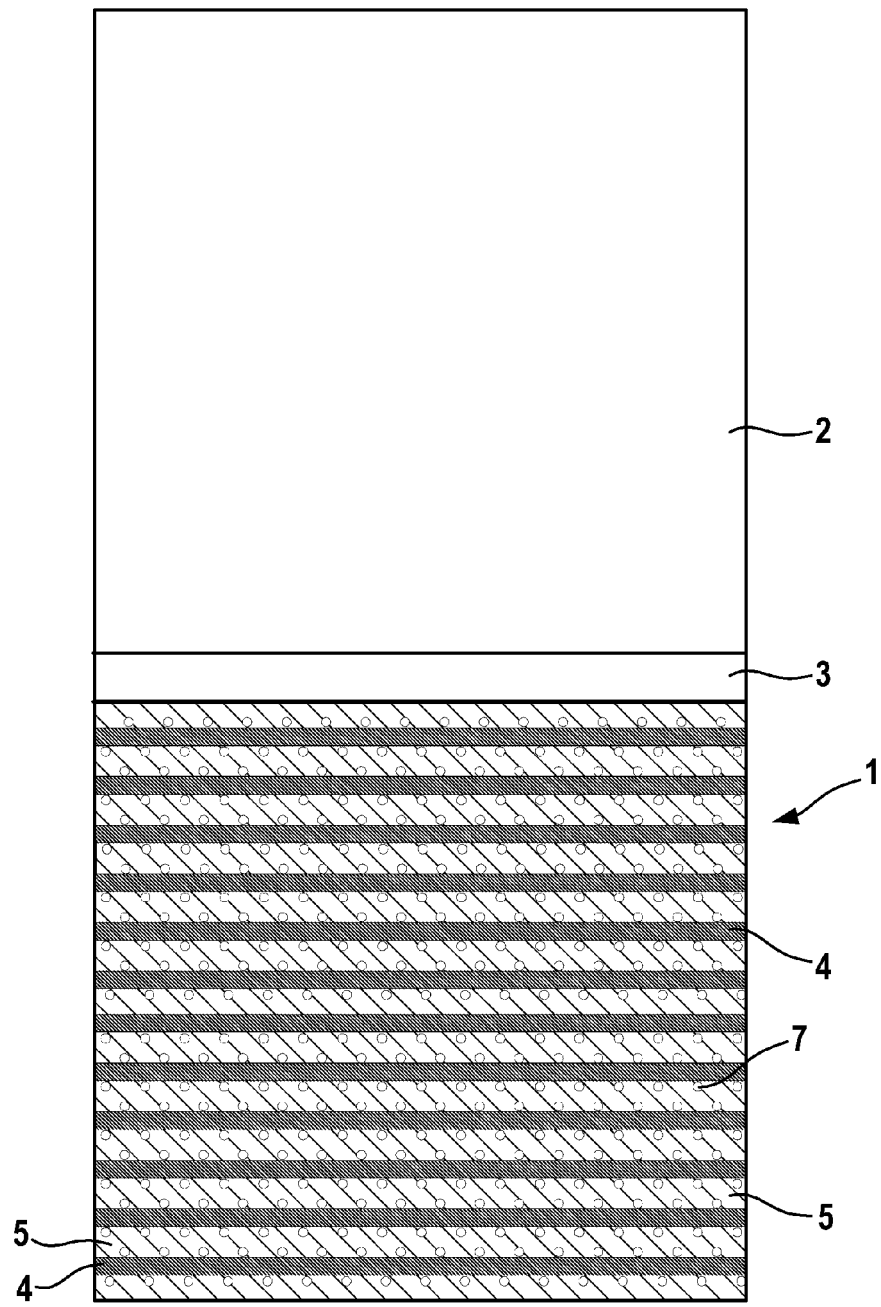
FIG. 7 shows a schematic cross section through a third embodiment of an electrochemical element according to the disclosure having a positive electrode, a separator and a negative electrode, with the layers of the layer system of the negative electrode being oriented parallel to the separator.

The third embodiment of an electrochemical element according to the disclosure shown in FIG. 7 differs from the first embodiment of an electrochemical element according to the disclosure shown in FIG. 5 in that the layer system 4,5,4 of the negative electrode 1 is oriented parallel to the separator 3.

The invention claimed is:

1. An electrochemical element, comprising:
   a negative electrode including at least one layer system that has at least two graphene layers and at least one polymer layer,
   a positive electrode,
   a separator arranged between the negative electrode and the positive electrode, and
   a polymer layer arranged between the at least two graphene layers.

2. The electrochemical element as claimed in claim 1, wherein each of the at least two graphene layers consists of a single graphene sheet.

3. The electrochemical element as claimed in claim 1, further comprising lithium atoms attached to both sides of the graphene layers.

4. The electrochemical element as claimed in claim 3, wherein the ratio of the number of carbon atoms of the graphene layer to the number of lithium atoms attached to the graphene layer is from 6:1.8 to 6:2.2.

5. The electrochemical element as claimed in claim 1, wherein the layer system comprises at least two graphene layers and at least two polymer layers, with the graphene layers and polymer layers being arranged alternately.

6. The electrochemical element as claimed in claim 1, wherein at least one outer layer of the layer system is a polymer layer.

7. The electrochemical element as claimed in claim 1, wherein the layers of the layer system are oriented perpendicular to the separator.

8. The electrochemical element as claimed in claim 1, wherein the negative electrode comprises a plurality of layer systems.

9. The electrochemical element as claimed in claim 8, wherein the negative electrode comprises a binder in which the plurality of layer systems are embedded.

10. The electrochemical element as claimed in claim 1, wherein the polymer layers and/or the binder comprise(s) at least one polymer selected from the group consisting of polyvinylidene fluoride, polyvinylidene-hexafluoropropylene copolymer, cellulose or polystyrene-butadiene copolymer and mixtures thereof.

11. A process for producing a negative electrode of an electrochemical element, comprising:
   a) applying a first graphene layer to a substrate;
   b) applying a first polymer layer to the first graphene layer; and c) applying a second graphene layer to the first polymer layer.

12. The process as claimed in claim 11, wherein:
step (a) includes applying the first graphene layer to the substrate by chemical vapor deposition; and
the second graphene layer is produced by chemical vapor deposition.

13. The process as claimed in claim 11, wherein step (a) includes applying the first graphene layer to the substrate by chemical vapor deposition.

14. The process as claimed in claim 11, wherein the second graphene layer is produced by chemical vapor deposition.

* * * * *